United States Patent [19]

Izumi et al.

[11] 3,926,791

[45] Dec. 16, 1975

[54] FLOTATION METHOD OF SEPARATION OF MIXTURE OF PLASTICS

[75] Inventors: Sumio Izumi; Hiroshi Tanaka, both of Tokyo, Japan

[73] Assignee: Mitsui Mining & Smelting Co., Ltd., Tokyo, Japan

[22] Filed: Feb. 19, 1974

[21] Appl. No.: 443,574

[30] Foreign Application Priority Data

May 22, 1973 Japan.................................. 48-57012

[52] U.S. Cl. ........................ 209/9; 209/11; 209/166
[51] Int. Cl.² ........................ B03D 1/02; B03D 1/00
[58] Field of Search ... 209/166, 167, 4, 9, 162–165, 209/11, 1, 2, 3; 210/53, 54, 44; 241/20, 24; 102/4.5

[56] References Cited
UNITED STATES PATENTS

| | | | |
|---|---|---|---|
| 787,518 | 4/1905 | Lawrence | 241/20 |
| 2,107,065 | 2/1938 | Peski | 209/166 |
| 2,378,152 | 6/1945 | Nagelvoort | 209/165 x |
| 2,389,958 | 11/1945 | Crawford | 210/54 X |
| 2,410,633 | 11/1946 | counselman | 209/165 X |
| 2,688,611 | 9/1954 | Jones | 209/166 X |
| 3,479,281 | 11/1969 | Kikindai | 209/164 x |
| 3,516,841 | 6/1970 | Haveman | 209/173 UX |

*Primary Examiner*—Robert Halper
*Attorney, Agent, or Firm*—Sughrue, Rothwell, Mion, Zinn & Macpeak

[57] ABSTRACT

A method for the separation of a mixture of plastics comprising a polyacrylate and polyvinyl chloride from each other by subjecting the mixture of plastics to a flotation method in the presence of at least one organic colloid and, optionally, an alkali metal or alkaline earth metal salt of lignin sulfonic acid as a conditioning agent thereby separating and recovering each of the plastics is disclosed.

16 Claims, No Drawings

FLOTATION METHOD OF SEPARATION OF MIXTURE OF PLASTICS

BACKGROUND OF THE INVENTION

1. Field of the Invention

This invention relates to a method for the separation of a mixture of plastics. More particularly, this invention relates to a method for the separation of a mixture of plastics comprising a polyacrylate and polyvinyl chloride, which are quite similar in their specific gravity, into the polyacrylate and polyvinyl chloride by flotation.

Polyacrylates included within the scope of this invention are polyacrylates and polymethacrylates such as polymethylmethacrylate, polyethylmethacrylate and the like. Hereinafter for simplicity the term "polyacrylate" is used throughout the specification of the present invention to refer to acrylate and methacrylate type plastics, acrylics and methacrylics of polyacrylates and polymethacrylate, these terms being generally used synonomously in the art, e.g., an acrylic type polymer such as of methyl methacrylate or ethyl methacrylate, and the like.

2. Description of the Prior Art

Hithertofore, waste plastics where two or more different types of plastics are mixed together have been disposed of by burying or by burning, or have been reused by melting and molding into molded articles. The most general procedure for the disposal of waste plastics is to subject the waste plastics to incineration. However, this treatment is not considered to be desirable since, for example, hydrogen chloride is usually generated when polyvinyl chloride is burned and the metals contained in the polyvinyl chloride as stabilizers are converted into their oxides which, in turn, adversely affect the incinerator. In addition, there is the possibility of causing environmental pollution where disposal by burning is used.

Mineral separations are well known in the ore processing art and are often used for separation of ores of similar character. In view of this it might be thought that such a known mineral processing method would be applicable to the separation and recovery of a mixture of plastics comprising a methacrylate and polyvinyl chloride and if so the problems associated with conventional burning disposal would be solved and the recovered plastics can be reused.

Accordingly, it is an object of this invention to provide a method for separating a mixture of a polyacrylate and polyvinyl chloride.

It is also an object of this invention to provide a method for separating a mixture of a polyacrylate and polyvinyl chloride resulting in the ability to reuse these plastics and eliminating the necessity for having to use prior art disposal methods previously necessary for waste plastic mixtures of these materials.

SUMMARY OF THE INVENTION

As a result of extensive studies, it was found that the above mixture of a polyacrylate and polyvinyl chloride can effectively be separated according to the method of this invention utilizing a flotation method.

The present invention comprises subjecting a mixture of plastics comprising a polyacrylate and polyvinyl chloride to flotation using at least one hydrophilic organic colloid and, optionally, an alkali metal or alkaline earth metal salt of lignin sulfonic acid, as a conditioning agent to separate the mixture into each of the plastics.

DETAILED DESCRIPTION OF THE INVENTION

As has been set forth above, utilization of a separation similar to those employed in mineral processing might have been thought to be suitable for the objects of this invention. However, according to the investigations by the present inventors, a polyacrylate and polyvinyl chloride, the components of the above mixture of plastics, are quite similar in their specific gravity and other physical properties, for example, electrical charge properties and it was practically impossible to separate the above mixture of plastics into each individual plastic by taking advantage of the difference in the specific gravity or by utilizing an electrostatic separation method. As a result of further investigations on the separation and recovery of each plastic from the mixture of plastics using a flotation method, it was found that the above described difficulties could be overcome and a mixture of plastics comprising a polyacrylate and polyvinyl chloride can be separated into each of the plastics by first comminuting the mixture into an appropriate size, conditioning the comminuted mixture of plastics in an aqueous liquid medium using at least one organic colloid and, optionally, an alkali metal or an alkaline earth metal salt of lignin sulfonic acid while stirring and subsequently effecting flotation whereby the polyacrylate is floated and the polyvinyl chloride can be separated together with a tail medium, i.e., the aqueous liquid medium.

The term "organic colloid" used herein refers to hydrophilic organic colloids which render the surfaces of the polyvinyl chloride more hydrophilic than the polyacrylate thereby increasing the wetting characteristics of the polyvinyl chloride. Hydrophilic organic colloids, per se, are well known in the field of ore dressing as described in, for example, A. F. Taggart, *Handbook of Mineral Dressing Ores and Industrial Minerals*, 1948, 12-33 to 12-34, John Wiley and Sons, Inc., New York. Suitable examples of the hydrophilic organic colloid which can be used in the present invention are tannic acid, a quebracho extract, gelatin, glue, saponin and the like. These hydrophilic organic colloids can be used alone or a mixture of two or more colloids.

Suitable examples of the alkali metal or alkaline earth metal salts of lignin sulfonic acid which can optionally be used in conjunction with the hydrophilic organic colloides are sodium lignin sulfonate, potassium lignin sulfonate, calcium lignin sulfonate, magnesium lignin sulfonate and the like.

The present invention is carried out in an aqueous liquid medium which includes water and salt water. Suitable examples of salt water include sea water, brine, bittern-containing water as well as aqueous solutions containing halides such as NaCl, $MgCl_2$, etc. sulfates such as $MgSO_4$, $CaSO_4$, $K_2SO_4$ and $Na_2SO_4$, etc. and bicarbonates such as $Ca(HCO_3)_2$ and $NaHCO_3$, etc. Water generally is employed as the aqueous liquid medium.

In the method of the present invention, while not desiring to be bound it is believed that the presence of the above organic colloids causes a certain difference in the wetting characteristic between the surfaces of the plastics to occur, i.e., the surface of the polyvinyl chloride becomes more hydrophilic than that of the polyacrylate. Thereby the mixture of plastics can be separated into each plastic by taking advantage of the above difference in the wetting characteristic in medium.

In employing the hydrophilic organic colloid as a conditioning agent in the method of this invention, the following parameters are considered to affect the efficiency of the flotation:

1. Weight ratio of the liquid medium and the mixture of plastics
2. Amount of the organic colloid used with respect to the amount of the mixture of plastics,
3. Grain size of the mixture of plastics,
4. Temperature and pH at which the mixture of the liquid medium and the mixture of plastics is conditioned using the organic colloid.

With respect to the weight ratio of the aqueous liquid medium and the mixture of plastics, the first parameter, the ratio is generally adjusted to a ratio of from 5 to 15 parts, more preferably 5 to 10 parts, by weight of the mixture of plastics per 100 parts by weight of the aqueous liquid medium. When the mixture of plastics is used in a ratio of lower than 5 parts by weight, the volume of medium to be handled increases thereby making the method un-economical.

As to the amount of the organic colloid relative to the amount of the mixture of plastics, the second parameter set forth above, the amount is preferably in the range of from about 5 to about 100 g, preferably 10 to 50 g, per ton of the mixture of plastics. With an amount below about 5 g, the separation effect of the mixture of plastics attainable in the flotation is poor and with an amount more than about 100 g, no additional advantages in the separation can be observed over the effect obtainable by using about 100 g of organic colloid. As described above, optionally, an alkali metal or alkaline earth metal salt of lignin sulfonic acid can be used in combination with the organic colloid. When an alkali metal or alkaline earth metal salt of lignin sulfonic acid is used in combination with the organic colloids the proportion of the salt of lignin sulfonic acid and the organic colloid is not critical.

With respect to the grain size of the mixture of plastics, the third parameter, the distribution of the grain size is not critical so long as more than 80% by weight of the mixture of plastics has a grain size on the order of approximately less than 10 mm. However, from the standpoint of handling and economy, it is preferred that more than 80% by weight of the mixture of plastics has a grain size of from 2 to 6 mm, most preferably 3 to 4 mm.

The temperature for the conditioning, the fourth parameter, is not critical in the method of this invention, but is preferably in the range of from about 0° to about 70°C, most preferably an environment temperature (about 15° to about 35°C). Temperatures below about 0°C are practically not preferred since at such low temperatures the efficiency of separation of the mixture of plastics in the subsequent flotation tends to decrease. On the other hand, the use of a temperature higher than about 70°C makes the method of the present invention uneconomical and, in addition, such a higher temperature is not desirable from the standpoint of the working environment.

A preferred pH for the conditioning is in the range of from about 5 to 10. Such a pH adjustment can be effected using either an alkali such as sodium hydroxide, sodium carbonate, lime or the like or an inorganic acid such as hydrochloric acid, sulfuric acid and the like.

After completion of the conditioning as described above, the subsequent flotation can be carried out by adding a flotation agent to the aqueous liquid medium containing the mixture of plastics. The flotation agent which can be used in the present invention includes a frothing agent and a collecting agent. These agents can be those commonly used in the flotation in ore dressing techniques as described in A. F. Taggart, *Handbook of Mineral Dressing Ores and Industrial Minerals*, 1948, 12-06 to 12-18 and 12-42 to 12-47, John Wiley and Sons, Inc., New York. Examples of suitable frothing agents are pine oil, cresylic acid, eucalyptus oil, camphor oil, derivatives of higher alcohols, methyl isobutyl carbinol or a mixture thereof. An example of the frothing agents which has been found to be particularly effective in the method of this invention is pine oil. Suitable examples of collecting agents are a fatty acid or a salt thereof, for example, oleic acid, stearic acid, palmitic acid and the like and an alkali metal salt thereof, most generally, oleic acid or sodium oleate. These flotation agents are generally added in an amount of from 1 to 100g per ton of the mixture of plastics. Subsequently, an aeration is conducted in a manner well known in conventional flotation procedures and the float is scraped out and the residue is collected together with a tail medium. The residence time of the mixture of plastics during the flotation is generally less than 30 minutes, e.g., 5 to 30 minutes. As is apparent to those skilled in the art, the flotation can be effected in a batch manner or a continuous manner, and in either case the amount of the flotation agent, the aeration and the residence time can be the same as described above.

The flotation described above results in a rough separation of polyvinyl chloride and the polyacrylate which is generally called "roughing". The purity of each of the separated fractions in this stage is improved but may not be as high as may be desired, e.g., for reclamation and reuse and each of the fractions may further be subjected to flotation to attain further purification of the fractions. Such flotations for further purifications (so-called "cleaning") can be carried out in the same manner as "roughing".

As described previously, the method of this invention comprises conditioning a mixture of plastics comprising a polyacrylate and polyvinyl chloride (either a hard or soft type) in an aqueous liquid medium using at least one organic colloid and, optionally, an alkali metal or alkaline earth metal salt of lignin sulfonic acid and floating the polyacrylate and simultaneously separating the polyvinyl chloride together with a tail medium and, therefore, the method is advantageous in that it eliminates the problems associated with conventional disposal by burning and it permits the reuse of each of the separated plastics.

The present invention is further illustrated in greater detail by following Examples, but these Examples are not to be construed as limiting the scope of this invention. Unless otherwise indicated, all parts, percentages and proportions are by weight.

EXAMPLE 1

10 parts by weight of a mixture of methyl methacrylate and polyvinyl chloride having a grain size of 3 to 4 mm in the proportion shown in Table 1 were added to 100 parts by weight of water, and the resulting mixture was conditioned using the conditioning agent shown in Table 1 for 10 minutes while maintaining the temperature at 50°C. Pine oil as a flotation agent was then added to the mixture in an amount of 10 g per 1 ton of the above mixture of plastics followed by roughing for 10 minutes and subsequently cleaning for 20 minutes to float the methyl methacrylate and at the same time to separate the polyvinyl chloride together with a tail medium. The results obtained are shown in Table 2 below.

Table 1

| Example No. | Weight Ratio of Methyl Methacrylate : Polyvinyl Chloride in the Mixture of Plastic | Conditioning Agent |
|---|---|---|
| 1 | 92 : 8 | Quebracho Extract |
| 2 | 70 : 30 | Calcium Lignin Sulfonate and Quebracho Extract (1 : 1 by weight) |
| 3 | 60 : 40 | Gelatin |
| 4 | 50 : 50 | Tannic Acid |
| 5 | 40 : 60 | Glue |
| 6 | 20 : 80 | Sodium Lignin Sulfonate, Gelatin and Saponin (1 : 1 : 1 by weight) |

Table 2

| Example No. | Materials | Weight (%) | Proportion (%) by weight | | Recovery (%) | | Conditioning Agent (Based on Weight of Mixture of Plastics) |
|---|---|---|---|---|---|---|---|
| | | | Methyl Methacrylate | Polyvinyl chloride | Methyl Methacrylate | Polyvinyl Chloride | |
| 1 | Mixture of Plastics | 100.0 | 92.0 | 8.0 | 100.0 | 100.0 | Quebracho Extract 30 g/ton |
| | Float | 85.0 | 98.0 | 2.0 | 91.0 | 20.0 | |
| | Residue | 15.0 | 55.0 | 45.0 | 9.0 | 80.0 | |
| 2 | Mixture of Plastics | 100.0 | 70.0 | 30.0 | 100.0 | 100.0 | Calcium Lignin Sulfonate and Quebracho Extract 15 g/ton |
| | Float | 68.0 | 92.0 | 8.0 | 92.0 | 18.0 | |
| | Residue | 32.0 | 22.0 | 78.0 | 8.0 | 82.0 | |
| 3 | Mixture of Plastics | 100.0 | 60.0 | 40.0 | 100.0 | 100.0 | Gelatin 10 g/ton |
| | Float | 62.0 | 90.0 | 10.0 | 93.0 | 15.0 | |
| | Residue | 38.0 | 11.0 | 89.0 | 7.0 | 85.0 | |
| 4 | Mixture of Plastics | 100.0 | 50.0 | 50.0 | 100.0 | 100.0 | Tannic Acid 50 g/ton |
| | Float | 51.0 | 93.0 | 7.0 | 95.0 | 7.0 | |
| | Residue | 49.0 | 5.0 | 95.0 | 5.0 | 93.0 | |
| 5 | Mixture of Plastics | 100.0 | 40.0 | 60.0 | 100.0 | 100.0 | Glue 20 g/ton |
| | Float | 36.0 | 72.0 | 28.0 | 65.0 | 17.0 | |
| | Residue | 64.0 | 22.0 | 78.0 | 35.0 | 83.0 | |
| 6 | Mixture of Plastics | 100.0 | 20.0 | 80.0 | 100.0 | 100.0 | Sodium Lignin Sulfonate, Gelatin and Saponin 30 g/ton |
| | Float | 22.0 | 57.0 | 43.0 | 63.0 | 12.0 | |
| | Residue | 78.0 | 10.0 | 90.0 | 37.0 | 88.0 | |

It will be apparent from the results shown in Table 2 that, in accordance with the method of this invention, the mixture of plastics comprising polyvinyl chloride and methyl methacrylate can be separated into each plastic in a high recovery ratio of 80 to 93%. Although each of the plastics thus separated can satisfactorily be reused as a raw material of the corresponding plastic, it will be understood by those skilled in the art that the percent recovery of each plastic can be increased by further subjecting the each of the separated plastics to the flotation procedure of the present invention in the same manner as above to obtain a plastic having a high purity.

While the invention has been described in detail and with reference to specific embodiments thereof, it will be apparent to one skilled in the art that various changes and modifications can be made therein without departing from the spirit and scope thereof.

What is claimed is:

1. A method for the separation of a particulate mixture of plastics comprising a polyacrylate and polyvinyl chloride into each of said plastics which comprises conditioning said mixture of plastics in an aqueous liquid medium using at least one hydrophilic organic colloid as a conditioning agent to render the surfaces of said polyvinyl chloride more hydrophilic than said polyacrylate and subjecting the resulting mixture to a froth flotation in the presence of a frothing agent, to float the polyacrylate and simultaneously separate the polyvinyl chloride together with said aqueous liquid medium, said polyacrylate being recovered as a float and sad polyvinyl chloride being recovered as a tailing.

2. The method according to claim 1, wherein said polyacrylate is polymethylmethacrylate of polyethylmethacrylate.

3. The method according to claim 1, wherein said hydrophilic organic colloid is tannic acid, a quebracho extract, gelatin, glue, saponin or a mixture thereof.

4. The method according to claim 1, wherein said aqueous liquid medium further includes an alkali metal or alkaline earth metal salt of lignin sulfonic acid.

5. The method according to claim 4, wherein said alkali metal or alkaline earth metal salt of lignin sulfonic acid is sodium lignin sulfonate, potassium lignin sulfonate, calcium lignin sulfonate or magnesium lignin sulfonate.

6. The method according to claim 1, wherein said mixture of plastics is present in a proportion of from about 5 to 15 parts by weight per 100 parts by weight of the aqueous liquid medium.

7. The method according to claim 1, wherein said conditioning agent is present in a proportion of from about 5 to 100 g per ton of said mixture of plastics.

8. The method according to claim 1, wherein said conditioning is at a temperature in the range of from about 0°C to 70°C.

9. The method according to claim 1, wherein said aqueous liquid medium is water or a salt water.

10. The method according to claim 9, wherein said salt water is sea water, brine or an aqueous solution of a halide, sulfate or bicarbonate.

11. The method according to claim 1, wherein said mixture of plastics is present in a proportion of 5 to 10 parts by weight per 100 parts by weight of the aqueous liquid medium and said conditioning agent is present in an amount of from 10 to 50 g per ton of the mixture of plastics.

12. The method according to claim 11, wherein the particles of plastic have a grain size distribution wherein more than 80% by weight of the mixture of plastics is approximately less than 10 mm.

13. The method according to claim 12, wherein the mixture of plastics has a grain size of from 2 to 6 mm.

14. The method according to claim 13, wherein the temperature of conditioning is from about 15° to about 35°C.

15. The method according to claim 14, wherein the pH during conditioning is from about 5 to 10.

16. The method according to claim 1, wherein said frothing agent is pine oil.

* * * * *